(12) United States Patent
Guo et al.

(10) Patent No.: US 12,354,323 B2
(45) Date of Patent: Jul. 8, 2025

(54) IMAGE PROCESSING METHOD AND APPARATUS, DEVICE, MEDIUM AND PROGRAM PRODUCT

(71) Applicant: Beijing Baidu Netcom Science Technology Co., Ltd., Beijing (CN)

(72) Inventors: Ruoyu Guo, Beijing (CN); Yuning Du, Beijing (CN); Shengyu Wei, Beijing (CN); Shuilong Dong, Beijing (CN); Qiwen Liu, Beijing (CN); Qiao Zhao, Beijing (CN); Ran Bi, Beijing (CN); Xiaoguang Hu, Beijing (CN); Dianhai Yu, Beijing (CN); Yanjun Ma, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 298 days.

(21) Appl. No.: 18/078,635

(22) Filed: Dec. 9, 2022

(65) Prior Publication Data
US 2023/0186599 A1    Jun. 15, 2023

(30) Foreign Application Priority Data
Dec. 10, 2021   (CN) .......................... 202111507276.5

(51) Int. Cl.
*G06V 10/74*   (2022.01)
*G06V 10/75*   (2022.01)

(52) U.S. Cl.
CPC .......... *G06V 10/761* (2022.01); *G06V 10/751* (2022.01)

(58) Field of Classification Search
CPC .. G06V 10/761; G06V 10/751; G06V 10/774; G06V 20/625; G06V 40/161; Y02D 10/00; G06F 18/214
See application file for complete search history.

(56) References Cited

U.S. PATENT DOCUMENTS

| | | | |
|---|---|---|---|
| 2021/0150282 A1* | 5/2021 | Chadha ................. | G06F 18/254 |
| 2023/0098548 A1* | 3/2023 | Zhang .................... | G06N 3/084 |
| | | | 382/284 |

(Continued)

FOREIGN PATENT DOCUMENTS

| | | |
|---|---|---|
| CN | 110992297 A | 4/2020 |
| CN | 111640103 A | 9/2020 |

(Continued)

OTHER PUBLICATIONS

Supplemental Search Report issued on Feb. 2, 2023 by CIPO in corresponding patent application No. 202111507276.5, with English translation.

(Continued)

*Primary Examiner* — Xuemei G Chen
*Assistant Examiner* — Han Hoang
(74) *Attorney, Agent, or Firm* — NORTON ROSE FULBRIGHT US LLP (57) ABSTRACT

Provided are an image processing method and apparatus, a device, a medium and a program product. The image processing method includes: performing image augmentation on an original image to obtain at least one augmented image; performing subject detection on the original image and the at least one augmented image to obtain an original detection frame in the original image and an augmented detection frame in the at least one augmented image; determining whether the original detection frame and the augmented detection frame belong to the same subject; and in response to the original detection frame and the augmented detection frame belonging to the same subject, determining a target subject frame in the original image according to the augmented detection frame.

20 Claims, 5 Drawing Sheets

(56) References Cited

U.S. PATENT DOCUMENTS

2023/0186492 A1* 6/2023 Yu ........................... G06T 7/246
382/100
2023/0186599 A1   6/2023 Guo et al.

FOREIGN PATENT DOCUMENTS

| CN | 111967313 A | 11/2020 |
| CN | 112149503 A | 12/2020 |
| CN | 112183456 A | 1/2021 |
| CN | 112183509 A | 1/2021 |
| CN | 112434587 A | 3/2021 |
| CN | 112861656 A | 5/2021 |
| CN | 112926551 A | 6/2021 |
| CN | 112991349 A | 6/2021 |
| CN | 113283485 A | 8/2021 |
| CN | 113537017 A | 10/2021 |
| JP | 2020004166 A | 1/2020 |
| JP | 2021064043 A | 4/2021 |

OTHER PUBLICATIONS

Office Action issued on Feb. 5, 2023 by the CIPO in the corresponding Patent Application No. 202111507276.5, with English translation.

Zoph, et al.: "Learning Data Augmentation Strategies for Object Detection," arXiv:1906.11172v1, (2019), pp. 1-13.

Supplemental Search Report issued by CIPO in corresponding patent application No. 202111507276.5 on Oct. 26, 2023, with English translation.

Office Action issued on Oct. 17, 2023 by the JPO in the corresponding Patent Application No. 2022-195970, with English translation.

* cited by examiner

IMAGE PROCESSING METHOD AND APPARATUS, DEVICE, MEDIUM AND PROGRAM PRODUCT

CROSS-REFERENCE TO RELATED APPLICATION

This application claims priority to Chinese Patent Application No. 202111507276.5 filed on Dec. 10, 2021, the disclosure of which is incorporated herein by reference in its entirety.

TECHNICAL FIELD

The present disclosure relates to the field of computer technologies and, in particular, to the field of computer vision, for example, an image processing method and apparatus, a device, a medium and a program product.

BACKGROUND

As one of the commonly used technologies in the field of computer vision, image recognition has been widely applied in many fields, such as face recognition, vehicle license plate recognition and commodity recognition.

Image recognition generally requires cutting the subject region in a to-be-recognized image and then comparing the features of the subject region with the features of the image in the retrieval library, thereby obtaining the final recognition result. An image in the retrieval library is generally obtained by cutting the subject region in the image and annotating the cut subject region. When the retrieval library is constructed, subject detection and annotation are required to be performed on a large number of images. How to reduce the cost of subject detection is very important for the construction of the retrieval library.

SUMMARY

The present disclosure provides an image processing method and apparatus, a device, a medium and a program product.

According to an aspect of the present disclosure, an image processing method is provided. The method includes the steps below.

Image augmentation is performed on an original image to obtain at least one augmented image.

Subject detection is performed on the original image and the at least one augmented image to obtain an original detection frame in the original image and an augmented detection frame in the at least one augmented image.

Whether the original detection frame and the augmented detection frame belong to a same subject is determined.

In response to the original detection frame and the augmented detection frame belonging to the same subject, a target subject frame in the original image is determined according to the augmented detection frame.

According to another aspect of the present disclosure, an image processing apparatus is provided. The apparatus includes an image augmentation module, a subject detection module, a same subject determination module and a target subject frame determination module.

The image augmentation module is configured to perform image augmentation on an original image to obtain at least one augmented image.

The subject detection module is configured to perform subject detection on the original image and the at least one augmented image to obtain an original detection frame in the original image and an augmented detection frame in the at least one augmented image.

The same subject determination module is configured to determine whether the original detection frame and the augmented detection frame belong to a same subject.

The target subject frame determination module is configured to, in response to the overlap rate being greater than an overlap rate threshold, determine a target subject frame in the original image according to the augmented detection frame.

According to another aspect of the present disclosure, an electronic device is provided. The electronic device includes at least one processor and a memory communicatively connected to the at least one processor. The memory stores instructions executable by the at least one processor to cause the at least one processor to perform the image processing method according to any embodiment of the present disclosure.

According to another aspect of the present disclosure, a non-transitory computer-readable storage medium is provided. The storage medium stores computer instructions configured to cause a computer to perform the image processing method according to any embodiment of the present disclosure.

According to another aspect of the present disclosure, a computer program product is provided. The computer program product includes a computer program which, when executed by a processor, causes the processor to perform the image processing method according to any embodiment of the present disclosure.

BRIEF DESCRIPTION OF DRAWINGS

The drawings are intended to provide a better understanding of the solution and not to limit the present disclosure.

DETAILED DESCRIPTION

Example embodiments of the present disclosure, including details of embodiments of the present disclosure, are described hereinafter in conjunction with drawings to facilitate understanding. The example embodiments are illustrative only. Similarly, description of well-known functions and constructions is omitted hereinafter for clarity and conciseness.

Figure 1A:
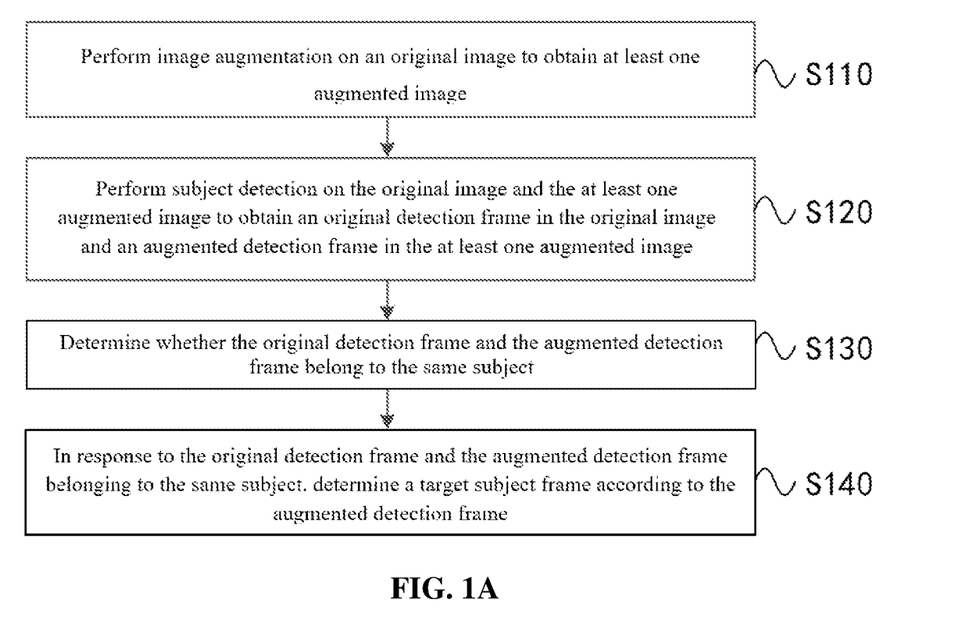
FIG. 1A is a diagram of an image processing method according to an embodiment of the present disclosure.

FIG. 1A is a flowchart of an image processing method according to an embodiment of the present disclosure. The present embodiment is applicable to a case where subject detection is performed on an original image by the original image and an augmented image. The method of the present embodiment is executable by an image processing apparatus. The apparatus may be implemented by software and/or hardware and is specifically configured in an electronic device having a certain data computing capability. The electronic device may be a client device or a server device. The client device is, for example, a mobile phone, a tablet computer, a vehicle-mounted terminal, or a desktop computer.

In S110, image augmentation is performed on an original image to obtain at least one augmented image.

The original image is an image that requires subject detection, and the original image includes one or more subjects. Exemplarily, the original image includes a person and a beverage bottle in the person's hand, and in this case, the subjects included in the original image are the person and the beverage bottle.

Image augmentation refers to the technology in which a series of random changes are made to the original image to obtain images similar to the original image. The augmented image is an image obtained by performing image augmentation on the original image. Exemplarily, the augmented image may be an image obtained by performing such operations as horizontal flipping, vertical flipping, random cutting, or color conversion, on the original image.

In the present embodiment of the present disclosure, to improve the accuracy of subject detection, before subject detection is performed on the original image, the image augmentation may be performed on the original image to obtain one or more augmented images. Exemplarily, the original image is subjected to horizontal flipping, vertical flipping and color conversion to obtain three augmented images similar to but different from the original image.

In the subsequent recognition process, the subject detection may be performed on the original image and the at least one augmented image simultaneously to obtain subject detection frames for different images, and the final target subject frame is obtained by fusion of the subject detection frames for different images. Compared with the method of obtaining the target subject frame by only performing the subject detection on the original image, the fusion of the subject detection frames for different images may avoid the loss of subject features caused by the inaccuracy of the subject detection on the original image so that the accuracy of subject detection can be improved.

In S120, subject detection is performed on the original image and the at least one augmented image to obtain an original detection frame in the original image and an augmented detection frame in the at least one augmented image.

After the at least one augmented image for the original image is acquired, the subject detection is performed on the original image and the at least one augmented image to obtain the original detection frame in the original image and the augmented detection frame in the at least one augmented image. Specifically, the original image and the at least one augmented image may be input to a subject detection model to obtain the original detection frame for the original image output by the subject detection model and the augmented detection frame for the at least one augmented image output by the subject detection model. The subject detection model may be obtained by training image samples and the subject annotation information corresponding to the image samples.

Exemplarily, the original image is horizontally flipped to obtain a first augmented image, and the original image is vertically flipped to obtain a second augmented image. The original image, the first augmented image and the second augmented image are input to the subject detection model to obtain three original detection frames for the original image output by the subject detection model, three first augmented detection frames for the first augmented image output by the subject detection model and three third augmented detection frames for the second augmented image output by the subject detection model.

It is to be noted that the information output by the subject detection module further includes the score of each detection frame, and the score may represent the confidence of its corresponding detection frame.

In S130, whether the original detection frame and the augmented detection frame belong to the same subject is determined.

To improve the accuracy of subject detection, the original detection frame and the augmented detection frame may be compared to determine whether the two frames include the same subject. Specifically, the Intersection over Union between the original detection frame and the augmented detection frame may be calculated, and whether the original detection frame and the augmented detection frame belong to the same subject is determined by comparing the Intersection over Union with a preset Intersection over Union threshold. When the original detection frame and the augmented detection frame belong to the same subject, the final target subject frame may be jointly determined according to the original detection frame and the augmented detection frame.

Exemplarily, the subject detection model outputs three original detection frames for the original image and three first augmented detection frames for the at least one augmented image. The three original detection frames are sorted according to the score of each original detection frame to obtain the original detection frame sequence, and the three first augmented detection frames are sorted according to the score of each first augmented detection frame to obtain the first augmented detection frame sequence. The original detection frames are sequentially acquired and used as the first original detection frames from the original detection frame sequence. Further, the Intersections over Union between the first original detection frames and the each first augmented detection frame are sequentially calculated according to the sequence of the three first augmented detection frames in the first augmented detection frame sequence. In response to the Intersection over Union being greater than the preset Intersection over Union threshold, that the original detection frame and the first augmented detection frame for comparison belong to the same subject is determined. For other original detection frames, the preceding operation of comparing with the each first augmented detection frame is repeated until the operation of comparing all the original detection frames with the each first augmented detection frame is completed.

Exemplarily, original detection frames and augmented detection frames are jointly sorted according to the subject detection scores to obtain the detection frame sequence. According to the arrangement sequence, one detection frame is acquired and used as the first detection frame from the detection frame sequence, then other detection frames are sequentially used as the second detection frames, and the first detection frame and the second detection frame are compared. After one round of comparison is completed, the next detection frame is acquired and used as the first detection frame from the detection frame sequence, and the process of comparing the first detection with other detection frames is repeated until the pairwise comparisons of the detection frames in the detection frame sequence are completed.

In S140, in response to the original detection frame and the augmented detection frame belonging to the same subject, a target subject frame in the original image is determined according to the augmented detection frame.

In response to the original detection frame and the augmented detection frame for comparison belonging to the same subject, the original detection frame may be updated according to the augmented detection frame so that the updated original detection frame can be used as the target subject frame in the original image.

Exemplarily, when the Intersection over Union between the original detection frame and the augmented detection frame for comparison is greater than 85%, that the original detection frame and the augmented detection frame belong to the same subject is determined. In this case, the augmented detection frame may be mapped into the original image to determine the position information of the region included in the augmented detection frame in the original image. Finally, the position information of the original detection frame may be updated according to the position information of the augmented detection frame in the original image to obtain the updated detection frame that is the target subject frame.

Figure 1B:
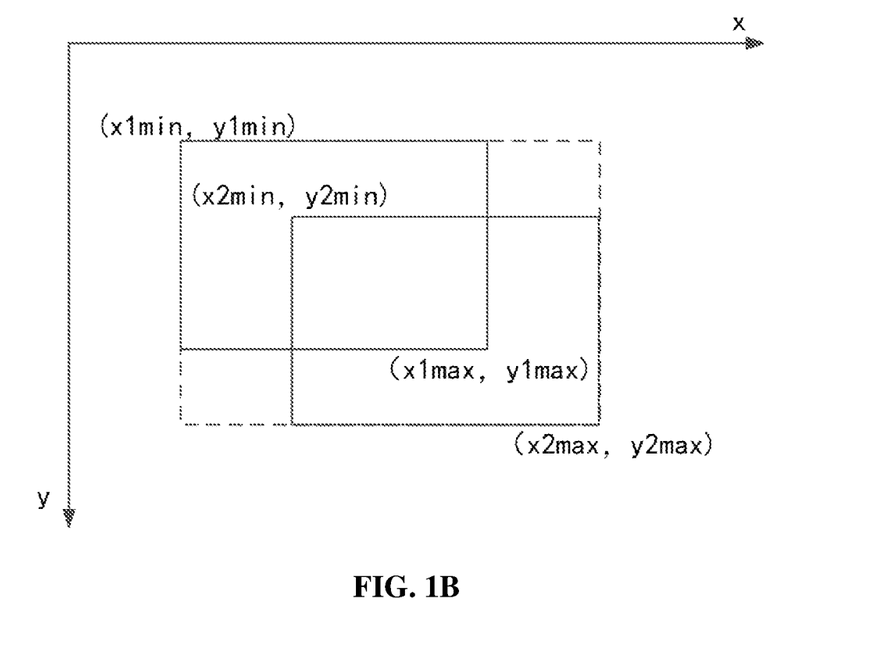
FIG. 1B is a diagram of a target subject frame determined according to an embodiment of the present disclosure.

In a specific example, as shown in FIG. 1B, the position information of the original detection frame in the original image is (x1 min, y1 min, x1max, y1max), where (x1 min, y1 min) may be understood as the upper-left corner coordinate of the original detection frame, and (x1 max, y1 max) may be understood as the lower-right corner coordinate of the original detection frame. The position information obtained by mapping the augmented detection frame into the original image is (x2 min, y2 min, x2max, y2max), where (x2 min, y2 min) may be understood as the upper-left corner coordinate of the augmented detection frame in the original image, and (x2max, y2max) may be understood as the lower-right corner coordinate of the augmented detection frame in the original image. To avoid the loss of subject features, the position information of the augmented detection frame may be used for updating the position information of the original detection frame to obtain the position information of the updated detection frame [min(x1 min, x2 min), min(y1 min, y2 min), max(x1 max, x2max), max(y1 max, y2max)], that is, (x1 min, y1 min, x2max, y2max). In this case, the position of the original detection frame is updated as the upper-left corner coordinate (x1 min, y1 min) and the lower-right corner coordinate (x2max, y2max). The updated original detection frame includes the original detection frame before updating and the augmented detection frame and is the target subject frame so that the problem of the loss of subject features can be avoided.

The image processing method provided by the present embodiment of the present disclosure is applicable to an image annotation scene in the construction process of the index library. Specifically, a large number of original images to be placed in the index library are required, and each original image corresponds to label information. With the image processing method provided by the present embodiment, subject detection is performed on the large number of original images to be placed in the index library, and the cutting of target subject frame is performed on the large number of original images. Further, one or more target subject frames obtained by cutting the large number of original images may be correspondingly stored with the labels of the large number of original images. Finally, the features of the target subject frames corresponding to the labels of the large number of original images are extracted, and the extracted features and the labels are added to the index library. In the preceding process, a developer only needs to select the target subject frame corresponding to the label information from multiple target subject frames obtained by cutting and delete the other target subject frames. Compared with the construction of the index library by use of a traditional manual annotation method, this method can greatly reduce the labor cost of image annotation and improve the accuracy of subject detection.

In the technical solution of the present embodiment of the present disclosure, first, the image augmentation is performed on the original image to obtain the at least one augmented image, the subject detection is performed on the original image and the at least one augmented image to obtain the original detection frame in the original image and the augmented detection frame in the at least one augmented image, and, further, in response to the original detection frame and the augmented detection frame belonging to the same subject, the target subject frame in the original image is determined according to the augmented detection frame. The accuracy of subject detection can be improved by jointly determining the target subject frame based on the original detection frame and the augmented detection frame.

Figure 2:
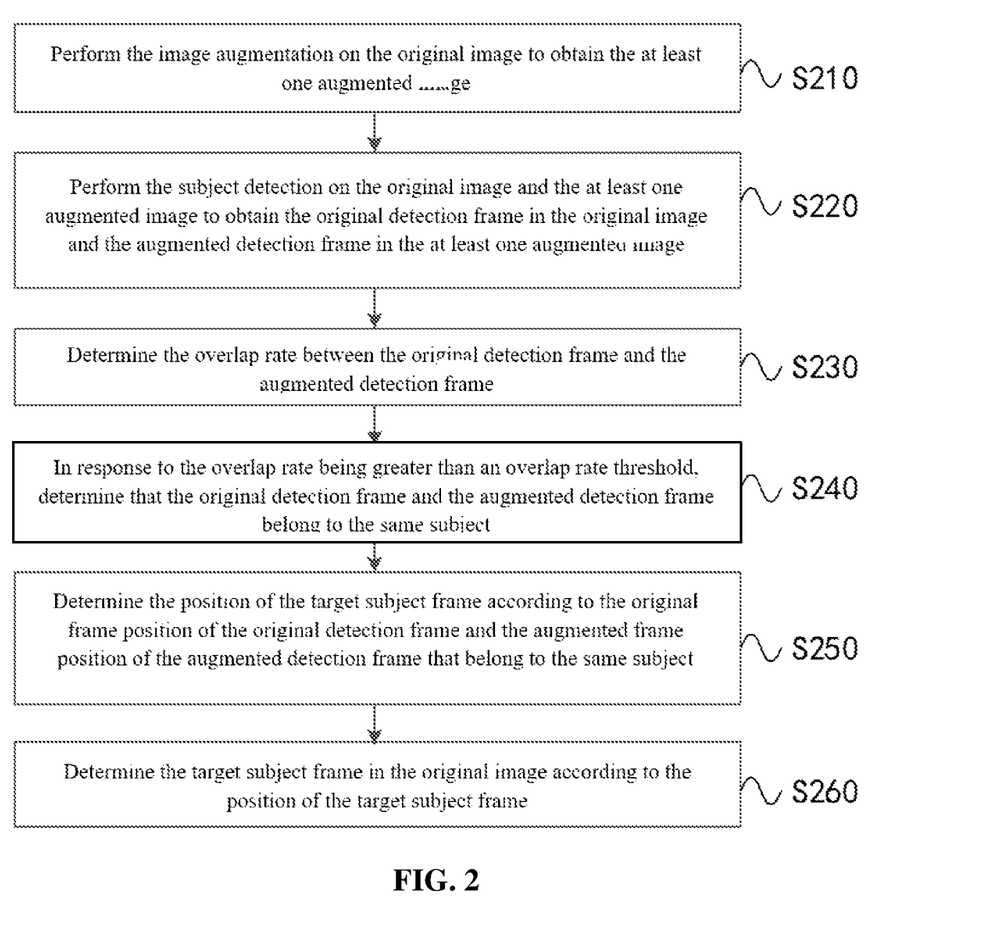
FIG. 2 is a diagram of another image processing method according to an embodiment of the present disclosure.

FIG. 2 is a diagram of an image processing method according to an embodiment of the present disclosure. Based on the preceding embodiment, the method is further refined by providing specific steps of determining whether the original detection frame and the augmented detection frame belong to the same subject and specific steps of determining, in response to the original detection frame and the augmented detection frame belonging to the same subject, the target subject frame in the original image according to the augmented detection frame. The image processing method provided by an embodiment of the present disclosure is described hereinafter in conjunction with FIG. 2. The method includes the steps below.

In S210, the image augmentation is performed on the original image to obtain the at least one augmented image.

In S220, the subject detection is performed on the original image and the at least one augmented image to obtain the original detection frame in the original image and the augmented detection frame in the at least one augmented image.

In S230, the overlap rate between the original detection frame and the augmented detection frame is determined.

The overlap rate, also referred to as the Intersection over Union, is used for representing the degree of overlap between the original detection frame and the augmented detection frame. The overlap rate may be obtained by calculating the ratio between the area of the overlap region between the original detection frame and the augmented detection frame and the area of the union region between the original detection frame and the augmented detection frame.

In the present embodiment of the present disclosure, to improve the accuracy of subject detection and avoid the loss of subjection features, the original detection frame may be updated according to the augmented detection frame. Specifically, the overlap rate between the original detection frame and the augmented detection frame is first calculated so that whether the original detection frame and the augmented detection frame correspond to the same subject can be determined according to the overlap rate.

In a specific example, the acquired k1 original detection frames, k2 first augmented detection frames and k3 second augmented detection frames may be sorted according to the corresponding scores to obtain one detection frame sequence. First, initialize i=1, and j=2. Further, when i=1, a first detection frame is acquired and used as the first detection frame, and other detection frames other than the first detection frame are sequentially acquired and used as the second detection frames starting from the jth detection frame in the detection frame sequence (that is, starting from the second detection frame). The first detection frame and the second detection frame are compared to obtain the Intersection over Union between the first detection frame and the second detection frame. After one round of comparison is completed, i is updated as i+1, and j is updated as j+1, and the preceding operation is repeated until i=k1+k2+k3. Subsequently, the ith detection frame is updated according to the calculation result of the Intersection over Union. For example, when the Intersection over Union is greater than the threshold, the two current detection frames for comparison are considered to belong to the same subject, and the ith detection frame is updated according to the jth detection frame to obtain the final target subject frame. In this manner, the loss of subject features can be avoided, and the accuracy of subject detection can be improved.

It is to be noted that in the preceding example, the pairwise comparisons between all the detection frames are performed. That is, the comparisons between different original detection frames are also included. However, in the process of subject detection, the subject detection model has already made a judgment on whether different detection frames in the same image belong to the same subject and has completed the operation of merging the detection frames belonging to the same subject. Therefore, in the preceding example, when different original detection frames are compared, the Intersection over Union is not greater than the threshold.

In another specific example, original detection frames and augmented detection frames may be sorted according to the scores. According to the sorted result of the original detection frames, the first original detection frame is acquired and used as the first detection frame from the original detection frames, and according to the sorted result of the augmented detection frames, the augmented detection frames are sequentially compared with the first detection frame to obtain the Intersections over Union. Then, according to the sorted result of the original detection frames, the next original detection frame is acquired and used as the first detection frame from the original detection frames, and according to the sorted result of the augmented detection frames, the augmented detection frames are sequentially compared with the first detection frame to obtain the Intersections over Union. The preceding operation is repeated until the comparisons between all the original detection frames and each augmented detection frame are completed.

Optionally, that the overlap rate between the original detection frame and the augmented detection frame is determined includes the steps below.

The processing sequence of the original detection frame and the augmented detection frame is determined according to the subject detection scores of at least two original detection frames and the subject detection scores of at least two augmented detection frames.

The processing sequence is used for determining the overlap rate between the original detection frame and the augmented detection frame.

In this optional embodiment, a specific manner of determining the overlap rate between the original detection frame and the augmented detection frame is the following: First, the processing sequence of the original detection frame and the augmented detection frame is determined according to the subject detection scores of the at least two original detection frames and the subject detection scores of the at least two augmented detection frames. Specifically, original detection frames and augmented detection frames are sorted according to the subject detection scores of the original detection frames and the subject detection scores of the augmented detection frames. According to the sorted result of the original detection frames, one original detection frame is acquired and used as the first detection frame from the original detection frames. Further, according to the sorted result of the augmented detection frames, the first detection frame and each augmented detection frame are compared, and the overlap rate between the first detection frame and the each augmented detection frame is calculated. After one round of comparison is completed, the next subject detection frame is acquired and used as the first detection frame according to the subjection detection scores of the original detection frames, and the comparison between the first detection frame and the each augmented detection frame is repeated until the comparisons between all the original detection frames and the each augmented detection frame are completed to obtain the overlap rates between the original detection frames and the each augmented detection frame. The processing sequence of the original detection frames and the augmented detection frames is determined in the preceding manner. The detection frames having higher subject detection scores may be first compared to first update the original detection frames having higher subject detection scores so that the accuracy of subject detection can be ensured.

In S240, in response to the overlap rate being greater than an overlap rate threshold, the original detection frame and the augmented detection frame belong to the same subject is determined.

In the present embodiment of the present disclosure, after the original detection frame and the augmented detection frame are compared to obtain the overlap rate between the original detection frame and the augmented detection frame, the overlap rate and a preset overlap rate threshold are compared. In response to the overlap rate being greater than the overlap rate threshold, that the original detection frame and the augmented detection frame for comparison currently correspond to the same subject is determined. Whether the original detection frame and the augmented detection frame belong to the same subject is determined by calculating the overlap tare, and the calculation amount is small. Moreover, after that the original detection frame and the augmented detection frame belong to the same subject is determined, the target subject frame may be jointly determined according to the original detection frame and the augmented detection frame so that the accuracy of subject detection can be improved.

Exemplarily, the acquired overlap rate between the original detection frame and the augmented detection frame is 90%, and the preset overlap rate threshold is 85%. Apparently, at this time, the overlap rate obtained by comparison is greater than the overlap rate threshold so that the original detection frame and the augmented detection frame for comparison currently belong to the same subject is determined.

In S250, the position of the target subject frame is determined according to the original frame position of the original detection frame and the augmented frame position of the augmented detection frame that belong to the same subject.

In the present embodiment of the present disclosure, when the original detection frame and the augmented detection frame for comparison belong to the same subject, the original detection frame may be updated according to the augmented detection frame. Specifically, the region in which the augmented detection frame is may be mapped into the original image to obtain the augmented frame position of the augmented detection frame. Further, the updated detection frame position is jointly determined according to the original frame position of the original detection frame and the augmented frame position of the augmented detection frame.

The position information of the original detection frame in the original image is (x1 min, y1 min, x1 max, y1 max), where (x1 min, y1 min) is the upper-left corner coordinate of the original detection frame, and (x1 max, y1 max) is the lower-right corner coordinate of the original detection frame. The position information obtained by mapping the augmented detection frame into the original image is (x2 min, y2 min, x2max, y2max), where (x2 min, y2 min) is the upper-left corner coordinate of the augmented detection frame, and (x2max, y2max) is the lower-right corner coordinate of the augmented detection frame. To avoid the loss of subject features, the position information of the augmented detection frame may be used for updating the position information of the original detection frame to obtain the position information of the updated detection frame [min(x1 min, x2 min), min(y1 min, y2 min), max(x1max, x2max), max(y1max, y2max)]. In this case, the position of the updated detection frame is the upper-left corner coordinate (x1 min y1 min) and the lower-right corner coordinate (x2max, y2max). The updated detection frame is the target subject frame.

In S260, the target subject frame in the original image is determined according to the position of the target subject frame.

In the present embodiment of the present disclosure, after the position of the target subject frame is determined, the target subject frame in the original image is determined according to the position of the target subject frame. Exemplarily, when the position of the target subject frame is (x1 min, y1 min, x2max, y2max), the target subject frame may be determined to be a rectangular frame having the upper-left corner coordinate (x1 min, y1 min) and the lower-right corner coordinate (x2max, y2max). The finally obtained target subject frame includes the original detection frame and the augmented detection frame. Compared with the method of obtaining the target subject frame by only performing the subject detection on the original image, this method can avoid the loss of subject features.

In the technical solution of the present embodiment of the present disclosure, first, the image augmentation is performed on the original image to obtain the at least one augmented image, the subject detection is performed on the original image and the at least one augmented image to obtain the original detection frame in the original image and the augmented detection frame in the at least one augmented image, and, further, in response to the original detection frame and the augmented detection frame belonging to the same subject, the position of the target subject frame is determined according to the original frame position of the original detection frame and the augmented frame position of the augmented detection frame that belong to the same subject, and the target subject frame in the original image is determined according to the position of the target subject frame. The accuracy of subject detection can be improved by jointly determining the target subject frame based on the original detection frame and the augmented detection frame.

Figure 3:
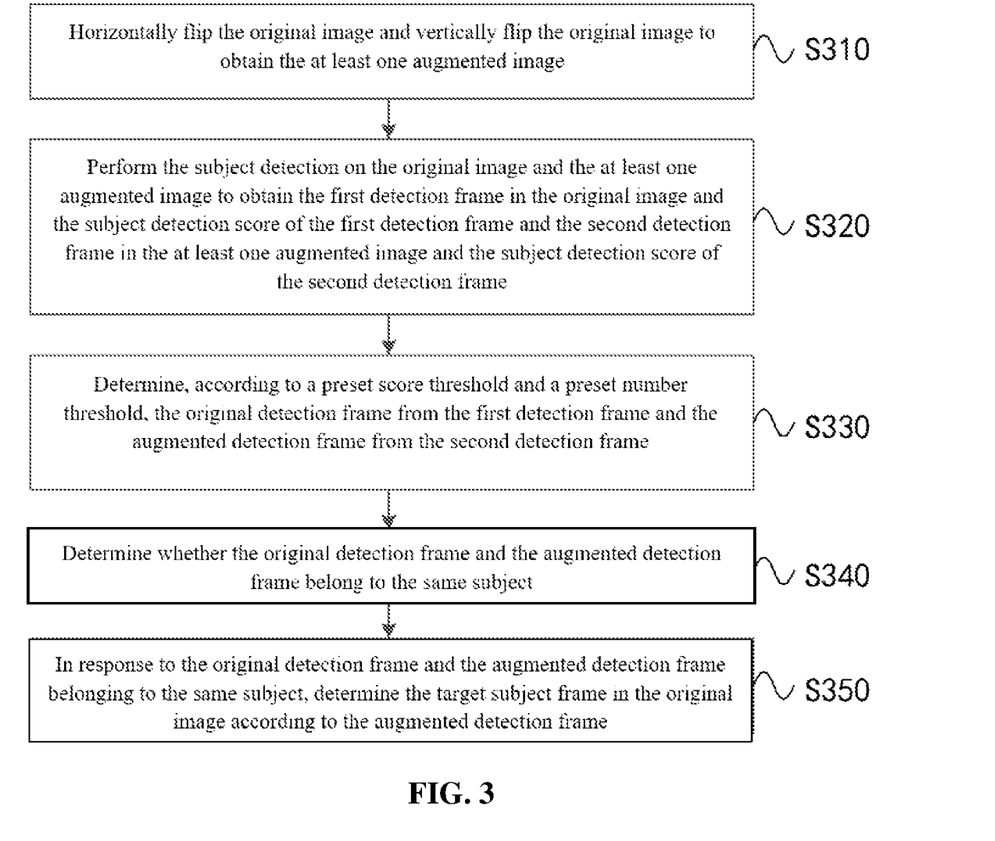
FIG. 3 is a diagram of another image processing method according to an embodiment of the present disclosure.

FIG. 3 is a diagram of an image processing method according to an embodiment of the present disclosure. Based on the preceding embodiment, the method is further refined by providing specific steps of performing the image augmentation on the original image to obtain the at least one augmented image and specific steps of performing the subject detection on the original image and the at least one augmented image to obtain the original detection frame in the original image and the augmented detection frame in the at least one augmented image. The image processing method provided by an embodiment of the present disclosure is described hereinafter in conjunction with FIG. 3. The method includes the steps below.

In S310, the original image is horizontally flipped and vertically flipped to obtain the at least one augmented image.

To improve the accuracy of subject detection on the original image, in the present embodiment of the present disclosure, the original image is first horizontally flipped to obtain the first augmented image, and the original image is vertically flipped to obtain the second augmented image. Augmented images similar to but different from the original image are obtained by flipping the original image, and the subject detection may be performed on the original image and the augmented images simultaneously in the subsequent subject detection process. Moreover, augmented detection frames corresponding to the augmented images may be used for updating the original detection frame in the original image to obtain the final target subject frame so that the loss of subject features can be avoided, and the accuracy of subject detection can be improved.

In S320, the subject detection is performed on the original image and the at least one augmented image to obtain the first detection frame in the original image and the subject detection score of the first detection frame and the second detection frame in the at least one augmented image and the subject detection score of the second detection frame.

In the present embodiment of the present disclosure, the original image and the at least one augmented image are input to the subject detection model for subject detection to obtain the first detection frame in the original image and the subject detection score of the first detection frame and the second detection frame in the at least one augmented image and the subject detection score of the second detection frame.

In a specific example, the original image is input to the subject detection model to obtain four first detection frames in the original image, and each first detection frame corresponds to a subject detection score. The at least one augmented image is input to the subject detection model to obtain five second detection frames in the at least one augmented image, and each second detection frame corresponds to a subject detection score.

In S330, according to a preset score threshold and a preset number threshold, the original detection frame is determined from the first detection frame, and the augmented detection frame is determined from the second detection frame.

The score threshold is used for limiting the subject detection score of the original detection frame and the subject detection score of the augmented detection frame. Exemplarily, an initial subject detection frame having a subject detection score greater than the score threshold is selected as the original detection frame from the initial subject detection frames output by the subject detection model for the original image. Similarly, an initial subject detection frame having a subject detection score greater than the score threshold is selected as the augmented detection frame from the initial subject detection frames output by the subject detection model for the at least one augmented image.

The number threshold is used for limiting the number of original detection frames and the number of augmented detection frames. For example, when the number threshold is set as kmax, the number of original detection frames and the number of augmented detection frames may be limited to be less than or equal to kmax.

After the first detection frame in the original image and the second detection frame in the at least one augmented image are acquired, ki detection frames whose corresponding subject detection scores are greater than the score threshold are acquired and used as the first candidate detection frames from at least one of the first detection frame according to the preset score threshold. Moreover, kj detection frames whose corresponding subject detection scores are greater than the score threshold are acquired and used as the second candidate detection frames from at least one of the second detection frame.

Further, according to the number threshold, the original detection frame is determined from the first candidate detection frames, and the augmented detection frame is determined from the second candidate detection frames. Specifically, the number threshold is kmax, and the number of finally acquired original detection frames is k1=min(ki, kmax). That is, when the number of the first candidate detection frames is greater than kmax, kmax first candidate detection frames are selected as the original detection frames according to a descending order of the subject detection scores. When the number of the first candidate detection frames is less than kmax, all the first candidate detection frames may be used as the original detection frames.

Similarly, when the augmented detection frame is determined from the second candidate detection frames, the number of augmented detection frames is k2=min(kj, kmax). That is, when the number of the second candidate detection frames is greater than kmax, kmax second candidate detection frames are selected as the augmented detection frames according to a descending order of the subject detection scores. When the number of the second candidate detection frames is less than kmax, all the second candidate detection frames may be used as the augmented detection frames.

The output subject detection frames are limited by the score threshold and the number threshold so that the accuracy and the recall rate of detection frames can be balanced by adjusting the score threshold and the number threshold.

In S340, whether the original detection frame and the augmented detection frame belong to the same subject is determined.

In S350, in response to the original detection frame and the augmented detection frame belonging to the same subject, the target subject frame in the original image is determined according to the augmented detection frame.

Optionally, the original image is added as the target subject frame.

In this optional embodiment, the original image may also be added as the target subject frame to avoid the subject undetected case caused by a too large ratio of the subject area in the original image area. Exemplarily, in the original image, only one beverage bottle is included, and the beverage bottle accounts for 90% of the area of the original image. At this time, the subject detection may lead to the target subject undetected case, or the bottle cover and the bottle pattern are identified as separate subjects, resulting in the loss of subject features. In the present embodiment of the present disclosure, the original image is also directly added as the target subject frame so that the subject undetected problem or the subject feature loss problem caused by a too large area occupied by the target subject in the original image can be avoided.

In the technical solution of the present embodiment of the present disclosure, first, the image augmentation is performed on the original image to obtain the at least one augmented image, the subject detection is performed on the original image and the at least one augmented image to obtain the original detection frame in the original image and the augmented detection frame in the at least one augmented image, and, further, in response to the original detection frame and the augmented detection frame belonging to the same subject, the position of the target subject frame is determined according to the original frame position of the original detection frame and the augmented frame position of the augmented detection frame that belong to the same subject, and the target subject frame in the original image is determined according to the position of the target subject frame. On one hand, the accuracy of subject detection can be improved by jointly determining the target subject frame based on the original detection frame and the augmented detection frame. On the other hand, the subject undetected problem caused by a too large area occupied by the subject in the image area can be avoided by adding the original image as the target subject frame.

Figure 4:
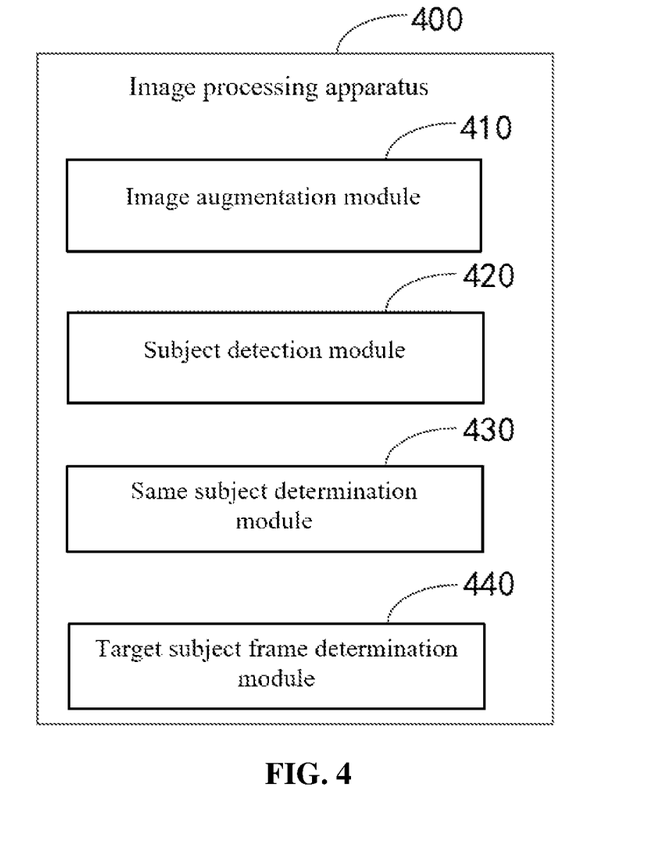
FIG. 4 is a diagram of an image processing apparatus according to an embodiment of the present disclosure.

According to an embodiment of the present disclosure, FIG. 4 is a diagram illustrating the structure of an image processing apparatus in an embodiment of the present disclosure. The present embodiment of the present disclosure is applicable to a case where subject detection is performed on an original image by the original image and an augmented image. The apparatus is implemented by software and/or hardware and is specifically configured in an electronic device having a certain data computing capability.

As shown in FIG. 4, the image processing apparatus 400 includes an image augmentation module 410, a subject detection module 420, a same subject detection module 430 and a target subject frame determination module 440.

The image augmentation module 410 is configured to perform image augmentation on an original image to obtain at least one augmented image.

The subject detection module 420 is configured to perform subject detection on the original image and the at least one augmented image to obtain an original detection frame in the original image and an augmented detection frame in the at least one augmented image.

The same subject determination module 430 is configured to determine whether the original detection frame and the augmented detection frame belong to the same subject.

The target subject frame determination module 440 is configured to, in response to the original detection frame and the augmented detection frame belonging to the same subject, determine a target subject frame in the original image according to the augmented detection frame.

In the technical solution of the present embodiment of the present disclosure, first, the image augmentation is performed on the original image to obtain the at least one augmented image, the subject detection is performed on the original image and the at least one augmented image to obtain the original detection frame in the original image and the augmented detection frame in the at least one augmented image, and, further, in response to the original detection frame and the augmented detection frame belonging to the same subject, the target subject frame in the original image is determined according to the augmented detection frame. The accuracy of subject detection can be improved by jointly determining the target subject frame based on the original detection frame and the augmented detection frame.

Further, the same subject determination module 430 includes an overlap rate determination unit and a same subject determination unit.

The overlap rate determination unit is configured to determine the overlap rate between the original detection frame and the augmented detection frame.

The same subject determination unit is configured to, in response to the overlap rate being greater than an overlap rate threshold, determine that the original detection frame and the augmented detection frame belong to the same subject.

Further, the overlap rate determination unit includes a processing sequence determination subunit and an overlap rate determination subunit.

The processing sequence determination subunit is configured to determine the processing sequence of the original detection frame and the augmented detection frame according to the subject detection scores of at least two original detection frames and the subject detection scores of at least two augmented detection frames.

The overlap rate determination subunit is configured to use the processing sequence to determine the overlap rate between the original detection frame and the augmented detection frame.

Further, the target subject frame determination module 440 includes a subject frame position determination unit and a target subject frame determination unit.

The subject frame position determination unit is configured to determine the position of the target subject frame according to the original frame position of the original detection frame and the augmented frame position of the augmented detection frame that belong to the same subject.

The target subject frame determination unit is configured to determine the target subject frame in the original image according to the position of the target subject frame.

Further, the image augmentation module 410 is specifically configured to horizontally flip the original image and vertically flip the original image to obtain the at least one augmented image.

Further, the subject detection module 420 includes a subject detection unit and a detection frame determination unit.

The subject detection unit is configured to perform the subject detection on the original image and the at least one augmented image to obtain the first detection frame in the original image and the subject detection score of the first detection frame and the second detection frame in the at least one augmented image and the subject detection score of the second detection frame.

The detection frame determination unit is configured to determine, according to a preset score threshold and a preset number threshold, the original detection frame from the first detection frame and determine the augmented detection frame from the second detection frame.

Further, the image processing apparatus 400 includes a target subject frame adding module.

The target subject frame adding module is configured to add the original image as the target subject frame.

The image processing apparatus provided by the embodiment of the present disclosure can execute the image processing method provided by any embodiment of the present disclosure and has functional modules and beneficial effects corresponding to the execution method.

In the technical solutions of the present disclosure, the collection, storage, use, processing, transmission, provision, and disclosure of user personal information involved are in compliance with provisions of relevant laws and regulations and do not violate public order and good customs.

According to an embodiment of the present disclosure, the present disclosure further provides an electronic device, a readable storage medium and a computer program product.

Figure 5:
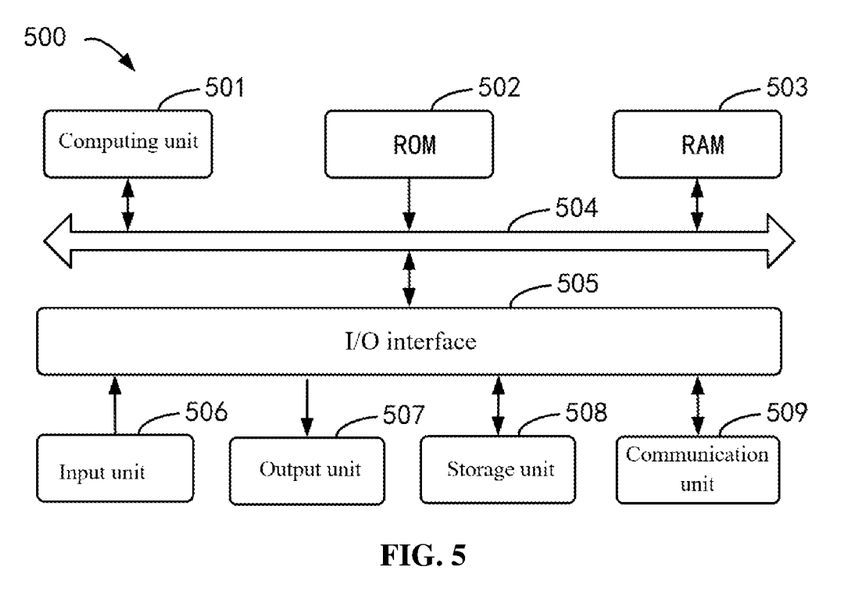
FIG. 5 is a block diagram of an electronic device for performing an image processing method according to an embodiment of the present disclosure.

FIG. 5 is a block diagram of an example electronic device 500 that may be configured to perform embodiments of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions of these components are illustrative only and are not intended to limit the implementation of the present disclosure as described and/or claimed herein.

As shown in FIG. 5, the device 500 includes a computing unit 501. The computing unit 501 may perform various appropriate actions and processing according to a computer program stored in a read-only memory (ROM) 502 or a computer program loaded into a random-access memory (RAM) 503 from a storage unit 508. Various programs and data required for the operation of the device 500 may also be stored in the RAM 503. The computing unit 501, the ROM 502 and the RAM 503 are connected to each other through a bus 504. An input/output (I/O) interface 505 is also connected to the bus 504.

Multiple components in the device 500 are connected to the I/O interface 505. The multiple components include an input unit 506, such as a keyboard or a mouse; an output unit 507, such as various types of displays or speakers; the storage unit 508, such as a magnetic disk or an optical disc; and a communication unit 509, such as a network card, a modem or a wireless communication transceiver. The communication unit 509 allows the device 500 to exchange information/data with other devices over a computer network, such as the Internet and/or various telecommunications networks.

The computing unit 501 may be various general-purpose and/or special-purpose processing components having processing and computing capabilities. Examples of the computing unit 501 include, but are not limited to, a central processing unit (CPU), a graphics processing unit (GPU), a special-purpose artificial intelligence (AI) computing chip, a computing unit executing machine learning models and algorithms, a digital signal processor (DSP), and any appropriate processor, controller and microcontroller. The computing unit 501 performs various methods and processing described in the preceding, such as the image processing method. For example, in some embodiments, the image processing method may be implemented as computer software programs tangibly contained in a machine-readable medium, such as the storage unit 508. In some embodiments, part or all of computer programs may be loaded and/or installed on the device 500 via the ROM 502 and/or the communication unit 509. When the computer program is loaded to the RAM 503 and executed by the computing unit 501, one or more steps of the preceding image processing method may be performed. Alternatively, in other embodiments, the computing unit 501 may be configured, in any other suitable manner (for example, by virtue of firmware), to perform the image processing method.

Herein various embodiments of the systems and techniques described in the preceding may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The at least one programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Program codes for implementation of the methods of the present disclosure may be written in one programming language or any combination of multiple programming languages. The program codes may be provided for the processor or controller of a general-purpose computer, a special-purpose computer, or another programmable data processing apparatus to enable functions/operations specified in flowcharts and/or block diagrams to be implemented when the program codes are executed by the processor or controller. The program codes may be executed entirely on a machine or may be executed partly on a machine. As a stand-alone software package, the program codes may be executed partly on a machine and partly on a remote machine or may be executed entirely on a remote machine or a server.

In the context of the present disclosure, the machine-readable medium may be a tangible medium that may include or store a program that is used by or used in conjunction with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware or front-end components. Components of a system may be interconnected by any form or medium of digital data communication (for example, a communication network). Examples of the communication network include a local area network (LAN), a wide area network (WAN) and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, a server of a distributed system, or a server combined with a blockchain.

It is to be understood that various forms of the preceding flows may be used with steps reordered, added, or removed. For example, the steps described in the present disclosure may be executed in parallel, in sequence or in a different order as long as the desired results of the technical solutions disclosed in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors.

What is claimed is:

1. An image processing method, comprising:
   acquiring an original image to be placed in an index library, wherein the original image corresponds to label information;
   performing image augmentation on the original image to obtain at least one augmented image;
   performing subject detection on the original image and the at least one augmented image to obtain an original detection frame in the original image and an augmented detection frame in the at least one augmented image;
   determining whether the original detection frame and the augmented detection frame belong to a same subject;
   in response to the original detection frame and the augmented detection frame belonging to the same subject, determining a target subject frame in the original image according to the augmented detection frame;
   cutting out the target subject frame from the original image, and storing at least one cut target subject frame correspondingly with the label information of the original image;
   performing feature extraction on the target subject frame stored correspondingly with the label information to obtain an extracted feature; and
   adding the extracted feature and the label information to the index library;
   wherein in response to the original detection frame and the augmented detection frame belonging to the same subject, determining the target subject frame in the original image according to the augmented detection frame comprises:

determining a position of the target subject frame according to an original frame position of the original detection frame and an augmented frame position of the augmented detection frame that belong to the same subject; and determining the target subject frame in the original image according to the position of the target subject frame, wherein the determined target subject frame comprises the original detection frame and the augmented detection frame.

2. The image processing method according to claim 1, wherein determining whether the original detection frame and the augmented detection frame belong to the same subject comprises:

determining an overlap rate between the original detection frame and the augmented detection frame; and in response to the overlap rate being greater than an overlap rate threshold, determining that the original detection frame and the augmented detection frame belong to the same subject.

3. The image processing method according to claim 2, wherein determining the overlap rate between the original detection frame and the augmented detection frame comprises:

determining a processing sequence of the original detection frame and the augmented detection frame according to subject detection scores of at least two original detection frames and subject detection scores of at least two augmented detection frames;

using the processing sequence to determine the overlap rate between the original detection frame and the augmented detection frame;

wherein determining the processing sequence of the original detection frame and the augmented detection frame according to the subject detection scores of at least two original detection frames and the subject detection scores of at least two augmented detection frames comprises:

sorting the at least two original detection frames according to a subject detection score of each of the at least two original detection frames to obtain an original detection frame sequence, and sorting the at least two augmented detection frames according to a subject detection score of each of the at least two augmented detection frames to obtain an augmented detection frame sequence; or sorting the at least two original detection frames and the at least two augmented detection frames jointly according to the subject detection scores of the at least two original detection frames and the subject detection scores of the at least two augmented detection frames to obtain a detection frame sequence;

wherein using the processing sequence to determine the overlap rate between the original detection frame and the augmented detection frame comprises:

sequentially acquiring one of the at least two original detection frames from the original detection frame sequence and using the one as a first original detection frame, and comparing, according to the augmented detection frame sequence, the first original detection frame with each of the at least two augmented detection frames to calculate an overlap rate between the first original detection frame and each of the at least two augmented detections frame until comparison of the at least two original detection frames with each of the at least two augmented detection frames is completed; or sequentially acquiring one detection frame from the detection frame sequence and using the one detection frame as a first detection frame, using each of other detection frames in the detection frame sequence as a second detection frame, and comparing the first detection frame and the second detection frame until pairwise comparisons of all detection frames in the detection frame sequence are completed.

4. The image processing method according to claim 1, wherein performing the image augmentation on the original image to obtain the at least one augmented image comprises:

horizontally flipping the original image and vertically flipping the original image to obtain the at least one augmented image.

5. The image processing method according to claim 1, wherein performing the subject detection on the original image and the at least one augmented image to obtain the original detection frame in the original image and the augmented detection frame in the at least one augmented image comprises:

performing the subject detection on the original image and the at least one augmented image to obtain a first detection frame in the original image and a subject detection score of the first detection frame and a second detection frame in the at least one augmented image and a subject detection score of the second detection frame; and determining, according to a preset score threshold and a preset number threshold, the original detection frame from the first detection frame and the augmented detection frame from the second detection frame.

6. The image processing method according to claim 1, further comprising:

adding the original image as the target subject frame.

7. The image processing method according to claim 1, wherein determining the position of the target subject frame according to the original frame position of the original detection frame and the augmented frame position of the augmented detection frame that belong to the same subject comprises:

mapping a region in which the augmented detection frame is located into the original image to obtain the augmented frame position of the augmented detection frame, and determining the position of the target subject frame jointly based on the original frame position of the original detection frame and the augmented frame position of the augmented detection frame.

8. An electronic device, comprising:

at least one processor; and a memory communicatively connected to the at least one processor, wherein the memory stores instructions executable by the at least one processor to cause the at least one processor to perform an image processing method comprising:

acquiring an original image to be placed in an index library, wherein the original image corresponds to label information;

performing image augmentation on the original image to obtain at least one augmented image;

performing subject detection on the original image and the at least one augmented image to obtain an original detection frame in the original image and an augmented detection frame in the at least one augmented image;

determining whether the original detection frame and the augmented detection frame belong to a same subject;

in response to the original detection frame and the augmented detection frame belonging to the same subject, determining a target subject frame in the original image according to the augmented detection frame;

cutting out the target subject frame from the original image, and storing at least one cut target subject frame correspondingly with the label information of the original image;

performing feature extraction on the target subject frame stored correspondingly with the label information to obtain an extracted feature; and adding the extracted feature and the label information to the index library;

wherein the at least one processor is caused to perform, in response to the original detection frame and the augmented detection frame belonging to the same subject, determining the target subject frame in the original image according to the augmented detection frame in the following manner:

determining a position of the target subject frame according to an original frame position of the original detection frame and an augmented frame position of the augmented detection frame that belong to the same subject; and determining the target subject frame in the original image according to the position of the target subject frame, wherein the determined target subject frame comprises the original detection frame and the augmented detection frame.

9. The electronic device according to claim 8, wherein the at least one processor is caused to perform determining whether the original detection frame and the augmented detection frame belong to the same subject by:

determining an overlap rate between the original detection frame and the augmented detection frame; and in response to the overlap rate being greater than an overlap rate threshold, determining that the original detection frame and the augmented detection frame belong to the same subject.

10. The electronic device according to claim 9, wherein the at least one processor is caused to perform determining the overlap rate between the original detection frame and the augmented detection frame by:

determining a processing sequence of the original detection frame and the augmented detection frame according to subject detection scores of at least two original detection frames and subject detection scores of at least two augmented detection frames; and using the processing sequence to determine the overlap rate between the original detection frame and the augmented detection frame;

wherein determining the processing sequence of the original detection frame and the augmented detection frame according to the subject detection scores of at least two original detection frames and the subject detection scores of at least two augmented detection frames comprises:

sorting the at least two original detection frames according to a subject detection score of each of the at least two original detection frames to obtain an original detection frame sequence, and sorting the at least two augmented detection frames according to a subject detection score of each of the at least two augmented detection frames to obtain an augmented detection frame sequence; or sorting the at least two original detection frames and the at least two augmented detection frames jointly according to the subject detection scores of the at least two original detection frames and the subject detection scores of the at least two augmented detection frames to obtain a detection frame sequence;

wherein using the processing sequence to determine the overlap rate between the original detection frame and the augmented detection frame comprises:

sequentially acquiring one of the at least two original detection frames from the original detection frame sequence and using the one as a first original detection frame, and comparing, according to the augmented detection frame sequence, the first original detection frame with each of the at least two augmented detection frames to calculate an overlap rate between the first original detection frame and each of the at least two augmented detections frame until comparison of the at least two original detection frames with each of the at least two augmented detection frames is completed; or sequentially acquiring one detection frame from the detection frame sequence and using the one detection frame as a first detection frame, using each of other detection frames in the detection frame sequence as a second detection frame, and comparing the first detection frame and the second detection frame until pairwise comparisons of all detection frames in the detection frame sequence are completed.

11. The electronic device according to claim 8, wherein the at least one processor is caused to perform the image augmentation on the original image to obtain the at least one augmented image by:

horizontally flipping the original image and vertically flipping the original image to obtain the at least one augmented image.

12. The electronic device according to claim 8, wherein the at least one processor is caused to perform the subject detection on the original image and the at least one augmented image to obtain the original detection frame in the original image and the augmented detection frame in the at least one augmented image by:

performing the subject detection on the original image and the at least one augmented image to obtain a first detection frame in the original image and a subject detection score of the first detection frame and a second detection frame in the at least one augmented image and a subject detection score of the second detection frame; and determining, according to a preset score threshold and a preset number threshold, the original detection frame from the first detection frame and the augmented detection frame from the second detection frame.

13. The electronic device according to claim 8, wherein the image processing method further comprises:

adding the original image as the target subject frame.

14. The electronic device according to claim 8, wherein the at least one processor is caused to perform determining the position of the target subject frame according to the original frame position of the original detection frame and the augmented frame position of the augmented detection frame that belong to the same subject by:

mapping a region in which the augmented detection frame is located into the original image to obtain the augmented frame position of the augmented detection frame, and determining the position of the target subject frame jointly based on the original frame position of the original detection frame and the augmented frame position of the augmented detection frame.

15. A non-transitory computer-readable storage medium storing computer instructions configured to cause a computer to perform an image processing method comprising:
    acquiring an original image to be placed in an index library, wherein the original image corresponds to label information;
    performing image augmentation on the original image to obtain at least one augmented image;
    performing subject detection on the original image and the at least one augmented image to obtain an original detection frame in the original image and an augmented detection frame in the at least one augmented image;
    determining whether the original detection frame and the augmented detection frame belong to a same subject;
    in response to the original detection frame and the augmented detection frame belonging to the same subject, determining a target subject frame in the original image according to the augmented detection frame;
    cutting out the target subject frame from the original image, and storing at least one cut target subject frame correspondingly with the label information of the original image;
    performing feature extraction on the target subject frame stored correspondingly with the label information to obtain an extracted feature; and
    adding the extracted feature and the label information to the index library;
    wherein the computer is caused to perform, in response to the original detection frame and the augmented detection frame belonging to the same subject, determining the target subject frame in the original image according to the augmented detection frame in the following manner:
        determining a position of the target subject frame according to an original frame position of the original detection frame and an augmented frame position of the augmented detection frame that belong to the same subject; and
        determining the target subject frame in the original image according to the position of the target subject frame, wherein the determined target subject frame comprises the original detection frame and the augmented detection frame.

16. The non-transitory computer-readable storage medium according to claim 15, wherein the computer is caused to perform determining whether the original detection frame and the augmented detection frame belong to the same subject by:
    determining an overlap rate between the original detection frame and the augmented detection frame; and
    in response to the overlap rate being greater than an overlap rate threshold, determining that the original detection frame and the augmented detection frame belong to the same subject.

17. The non-transitory computer-readable storage medium according to claim 16, wherein the computer is caused to perform determining the overlap rate between the original detection frame and the augmented detection frame by:
    determining a processing sequence of the original detection frame and the augmented detection frame according to subject detection scores of at least two original detection frames and subject detection scores of at least two augmented detection frames; and
    using the processing sequence to determine the overlap rate between the original detection frame and the augmented detection frame;
    wherein determining the processing sequence of the original detection frame and the augmented detection frame according to the subject detection scores of at least two original detection frames and the subject detection scores of at least two augmented detection frames comprises:
        sorting the at least two original detection frames according to a subject detection score of each of the at least two original detection frames to obtain an original detection frame sequence, and sorting the at least two augmented detection frames according to a subject detection score of each of the at least two augmented detection frames to obtain an augmented detection frame sequence; or
        sorting the at least two original detection frames and the at least two augmented detection frames jointly according to the subject detection scores of the at least two original detection frames and the subject detection scores of the at least two augmented detection frames to obtain a detection frame sequence;
    wherein using the processing sequence to determine the overlap rate between the original detection frame and the augmented detection frame comprises:
        sequentially acquiring one of the at least two original detection frames from the original detection frame sequence and using the one as a first original detection frame, and comparing, according to the augmented detection frame sequence, the first original detection frame with each of the at least two augmented detection frames to calculate an overlap rate between the first original detection frame and each of the at least two augmented detections frame until comparison of the at least two original detection frames with each of the at least two augmented detection frames is completed; or
        sequentially acquiring one detection frame from the detection frame sequence and using the one detection frame as a first detection frame, using each of other detection frames in the detection frame sequence as a second detection frame, and comparing the first detection frame and the second detection frame until pairwise comparisons of all detection frames in the detection frame sequence are completed.

18. The non-transitory computer-readable storage medium according to claim 15, wherein the computer is caused to perform the image augmentation on the original image to obtain the at least one augmented image by:
    horizontally flipping the original image and vertically flipping the original image to obtain the at least one augmented image.

19. The non-transitory computer-readable storage medium according to claim 15, wherein the computer is caused to perform the subject detection on the original image and the at least one augmented image to obtain the original detection frame in the original image and the augmented detection frame in the at least one augmented image by:
    performing the subject detection on the original image and the at least one augmented image to obtain a first detection frame in the original image and a subject detection score of the first detection frame and a second detection frame in the at least one augmented image and a subject detection score of the second detection frame; and determining, according to a preset score threshold and a preset number threshold, the original detection frame from the first detection frame and the augmented detection frame from the second detection frame.

20. The non-transitory computer-readable storage medium according to claim 15, wherein the image processing method further comprises adding the original image as the target subject frame.

* * * * *